US012469208B2

(12) United States Patent
Iwamoto et al.

(10) Patent No.: US 12,469,208 B2
(45) Date of Patent: Nov. 11, 2025

(54) GENERATION APPARATUS, GENERATION METHOD, AND NON-TRANSITORY COMPUTER-READABLE STORAGE MEDIUM

(71) Applicant: CANON KABUSHIKI KAISHA, Tokyo (JP)

(72) Inventors: Shohei Iwamoto, Kanagawa (JP); Rumie Oishi, Saitama (JP); Haruhisa Nakamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 225 days.

(21) Appl. No.: 18/359,707

(22) Filed: Jul. 26, 2023

(65) Prior Publication Data
US 2024/0046552 A1 Feb. 8, 2024

(30) Foreign Application Priority Data

Aug. 4, 2022 (JP) .................................. 2022-125088
Jun. 15, 2023 (JP) .................................. 2023-098260

(51) Int. Cl.
*G06T 15/20* (2011.01)
(52) U.S. Cl.
CPC .................................... *G06T 15/20* (2013.01)
(58) Field of Classification Search
CPC .............................. G06T 15/20; G06T 19/006
USPC ................................................. 345/418, 419
See application file for complete search history.

(56) References Cited

U.S. PATENT DOCUMENTS

| | | | | |
|---|---|---|---|---|
| 2011/0102425 A1* | 5/2011 | Ohta | ........................ | G06T 15/08 345/419 |
| 2018/0144447 A1* | 5/2018 | Tate | ........................ | G06T 5/60 |
| 2018/0197338 A1* | 7/2018 | Crispin | .................... | G06F 3/012 |
| 2018/0288391 A1* | 10/2018 | Lee | ........................ | G06F 3/011 |
| 2019/0132529 A1* | 5/2019 | Ito | ........................ | G06T 1/0007 |
| 2019/0206098 A1* | 7/2019 | Letzelter | ................ | G06T 11/203 |
| 2019/0394442 A1* | 12/2019 | Kawahara | ............ | H04N 13/117 |
| 2021/0082174 A1* | 3/2021 | Ogasawara | ............. | G06F 3/011 |
| 2021/0225065 A1* | 7/2021 | Holzer | ................. | H04N 23/611 |

FOREIGN PATENT DOCUMENTS

JP 2014041259 A 3/2014

OTHER PUBLICATIONS

Kawai Takashi Image Generation Device and Control Method Thereof Sep. 3, 2020 Canon KK JP2020140519 (A) paras. 6-54, Figs. 1-13B English.*
Kawai Takashi Image Generation Device and Control Method Thereof Sep. 3, 2020 Canon KK JP2020140519 (A) paras. 6-54, Figs. 1-13B Japanese.*

* cited by examiner

*Primary Examiner* — Prabodh M Dharia
(74) *Attorney, Agent, or Firm* — Canon U.S.A., Inc. IP Division

(57) ABSTRACT

A generation apparatus generates a virtual viewpoint image based on a foreground model, a virtual object model, and a virtual viewpoint. The virtual object has a shape with an alternate repetition of one of a plurality of first planes and one of a plurality of second planes. A normal line of each first plane and a normal line of each second plane extend in different directions. A virtual viewpoint image generated based on a first virtual viewpoint includes the first planes but does not include the second planes. And a virtual viewpoint image generated based on a second virtual viewpoint includes the second planes but does not include the first planes.

6 Claims, 10 Drawing Sheets

GENERATION APPARATUS, GENERATION METHOD, AND NON-TRANSITORY COMPUTER-READABLE STORAGE MEDIUM

BACKGROUND

Field

The present disclosure relates to a technique of generating a virtual viewpoint image.

Description of the Related Art

In recent years, attention has been drawn to a technique of capturing images with a plurality of cameras, which is installed at different positions, in synchronization with each other, and using a plurality of captured images to generate a virtual viewpoint image showing a scene viewed from a virtual viewpoint. This technique, for example, enables viewing of a highlight scene in a soccer game or a basketball game from various angles.

Japanese Patent Application Laid-Open No. 2014-41259 discusses a technique of arranging a virtual advertisement space in a virtual space, and generating a virtual viewpoint image including the virtual advertisement space based on a position of the virtual advertisement space.

The virtual viewpoint image is an image that provides an unprecedented viewing experience. However, in a case where a virtual object such as a virtual advertisement is included in the image, a method of presenting the virtual object in a more appealing manner has yet to be proposed.

SUMMARY

The present disclosure is directed to generation of a more appealing virtual viewpoint image including a virtual object.

According to an aspect of the present disclosure, a generation apparatus obtains a foreground model that is generated based on a plurality of captured images and that represents a three-dimensional shape of a foreground, a obtains a virtual object model that represents a three-dimensional shape of a virtual object, obtains viewpoint information that represents a position of a virtual viewpoint and a view direction from the virtual viewpoint, and generates a virtual viewpoint image based on the obtained foreground model, the obtained virtual object model, and the obtained virtual viewpoint. The virtual object has a shape with an alternate repetition of one of a plurality of first planes and one of a plurality of second planes, and a normal line of each first plane and a normal line of each second plane extend in different directions. A virtual viewpoint image generated based on a first virtual viewpoint includes the plurality of first planes but does not include the plurality of second planes, and a virtual viewpoint image generated based on a second virtual viewpoint includes the plurality of second planes but does not include the plurality of first planes.

Further features of the present disclosure will become apparent from the following description of exemplary embodiments with reference to the attached drawings.

DESCRIPTION OF THE EMBODIMENTS

A first exemplary embodiment of the present disclosure will be described in detail below with reference to the drawings. Exemplary embodiments do not limit the present disclosure, and all combinations of features described in the exemplary embodiments are not necessarily essential to a means for solving the issue. A virtual viewpoint image is an image generated by a user and/or a dedicated operator or the like performing an operation of freely adjusting a position and orientation of a virtual camera, and is also called a free-viewpoint image or an arbitrary viewpoint image. In the present disclosure, a description will be given mainly of a case where a virtual viewpoint is designated by a user operation, but the virtual viewpoint may be automatically designated based on a result of image analysis. Unless otherwise specified, the description is given assuming that the wording of an "image" includes concepts of both moving and still images.

The virtual camera mentioned herein is a virtual camera that is different from a plurality of imaging apparatuses that is actually installed around an imaging region, and is a concept for describing a virtual viewpoint related to generation of the virtual viewpoint image for convenience sake. The virtual viewpoint image can be regarded as an image captured from a virtual viewpoint that is set in a virtual space associated with the imaging region. The position and orientation of the virtual viewpoint in virtual image-capturing can be represented as the position and orientation of the virtual camera. In other words, assuming that a camera is arranged at a position of the virtual viewpoint set in a space, the virtual viewpoint image can be said as an image that imitates a captured image obtained by the camera. In the present exemplary embodiment, a content of transition of the virtual viewpoint overtime is referred to as a virtual camera path. However, the use of the concept of the virtual camera is not essential to implement the configuration of the present exemplary embodiment. That is, it is only required to set at least information indicating a specific position in the space and information indicating an orientation, and generate the virtual viewpoint image in accordance with the set information.

An imaging apparatus is only required to include a physical camera. The imaging apparatus may have, in addition to the physical camera, a function of performing various kinds of image processing. For example, the imaging apparatus may include a processing unit that performs foreground/background separation processing. The imaging apparatus may include a control unit that performs transmission control to transmit an image of a partial region of the captured image. The imaging apparatus may include a plurality of physical cameras.

Figure 1:
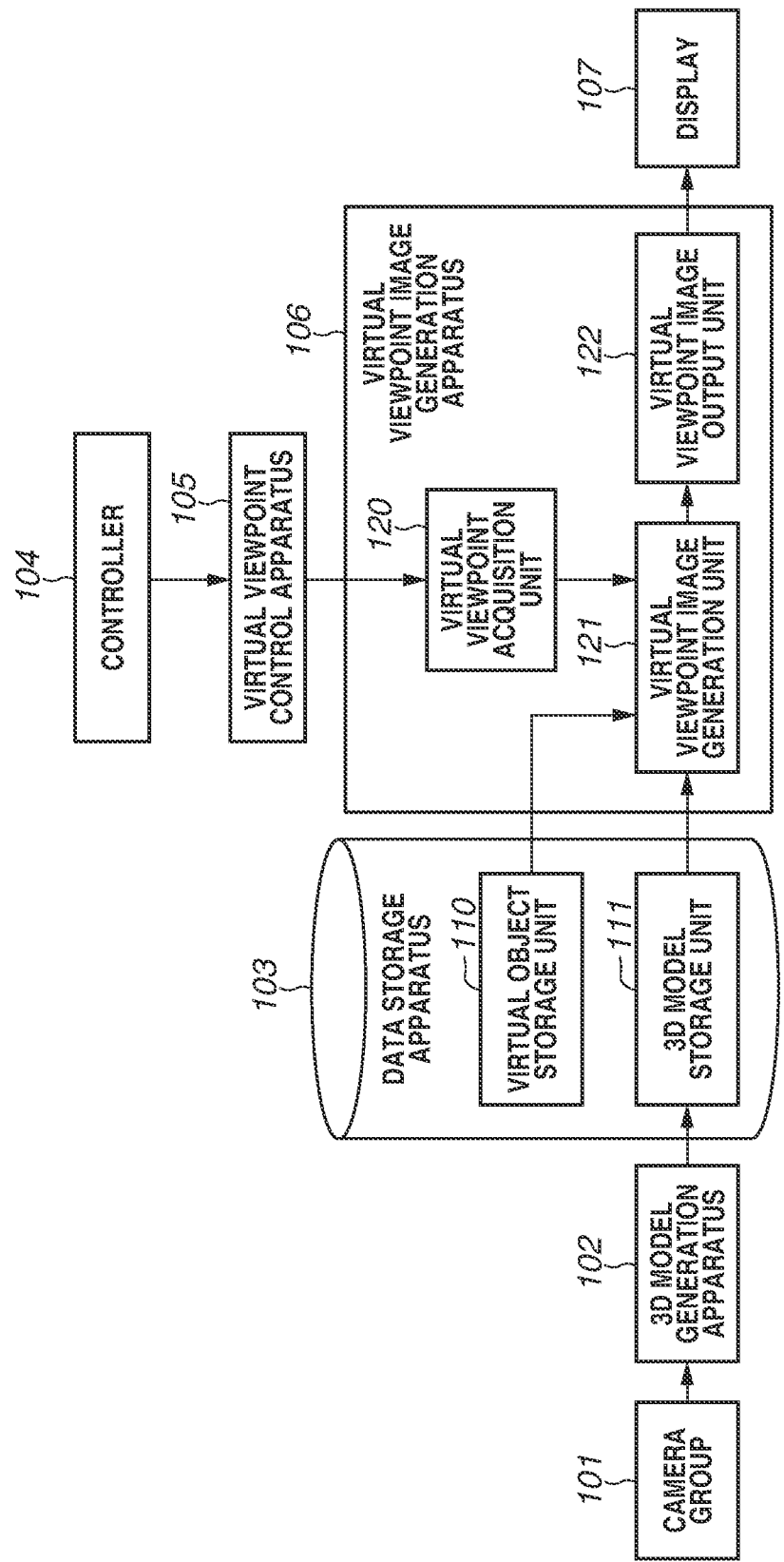
FIG. 1 is a system configuration diagram according to one or more aspects of the present disclosure.

FIG. 1 is a diagram illustrating a configuration of an image processing system according to the present exemplary embodiment. The system includes a camera group 101, a three-dimensional (3D) model generation apparatus 102, a data storage apparatus 103, a controller 104, a virtual viewpoint control apparatus 105, a virtual viewpoint image generation apparatus 106, and a display 107. The camera group 101, the controller 104, the virtual viewpoint control apparatus 105, and the display 107 may not be included in the system. Some of the components in the system may be integrated with each other. For example, the virtual viewpoint control apparatus 105 may include the display 107, or the virtual viewpoint image generation apparatus 106 may include the virtual viewpoint control apparatus 105 and the display 107. The display 107 may serve also as the controller 104.

The camera group 101 includes a plurality of physical cameras. The plurality of physical cameras is arranged at different positions, and captures images of an object from different viewpoints in synchronization with each other. The synchronization mentioned herein is a state where the physical cameras are controlled to capture images at almost simultaneous timings. A plurality of captured and acquired images, an extrinsic/intrinsic parameter of each physical camera, and the like are transmitted to the 3D model generation apparatus 102. The extrinsic parameter of the camera is a parameter indicating the position and orientation of the camera (for example, a rotation matrix and a position vector). The intrinsic parameter of the camera is an intrinsic parameter unique to the camera, and is, for example, a parameter of a focal length, a parameter of the center of an image, and a parameter of lens distortion. The plurality of physical cameras may be arranged so as to surround the object and capture images of the object. The plurality of physical cameras may be connected to the 3D model generation apparatus 102 via respective cables. The plurality of physical cameras may be cascade-connected to each other and cascade-connected also to the 3D model generation apparatus 102. The plurality of physical cameras may have an identical focal length. The plurality of physical cameras may include a physical camera with a telephoto lens, a physical camera with a wide-angle lens, a physical camera set to have a small angle of view, and a physical camera set to have a large angle of view.

The 3D model generation apparatus 102 generates a 3D model indicating a 3D shape of an object serving as a foreground based on the images captured by the camera group 101 and the extrinsic/intrinsic parameters of each camera, and outputs the 3D model to the data storage apparatus 103. The 3D model may be referred to as "3D shape data" in some cases. The object serving as the foreground (hereinafter referred to as a foreground object) is, for example, a human figure, a moving object, and the like that is located in the imaging range of the camera group 101. The 3D model generation apparatus 102 may create color information about the foreground object based on a 3D model of the foreground object (foreground model), a plurality of images of a region of the foreground object, and the extrinsic/intrinsic parameters of each physical camera, and output the color information of the foreground object to the data storage apparatus 103. The color information is information that associates a component of the 3D model and a color of the component with each other, and may be, for example, a texture map. However, a format of the color information is not limited to the texture map. In a case where the 3D model is a 3D point group, information indicating a corresponding color (red (R), green (G), and blue (B)) of a point serving as the component is the color information. The color information created by the 3D model generation apparatus 102 is color information that is independent of a virtual viewpoint, and that does not change in color depending on the position and orientation of the virtual camera. The position and orientation of the virtual camera will be described below. The 3D model and color information about the foreground object are generated separately for each foreground object, and output to the data storage apparatus 103. The 3D model generation apparatus 102 outputs the plurality of images input from the camera group 101 and the extrinsic/intrinsic parameters of each camera to the data storage apparatus 103. The 3D point group may be 3D voxel data.

Generation processing of generating the color information about the foreground object includes, for example, visibility determination processing of determining visibility of a point of the 3D point group representing the foreground object and color derivation processing. In the visibility determination processing, a physical camera that can capture an image of each point is identified based on a positional relationship between each point of the 3D point group and each of a plurality of physical cameras included in a physical camera group of the camera group 101, a visual field, and the like. In the color derivation processing, for example, a point of the 3D point group serves as a point of interest, and a color of the point of interest is derived. Specifically, the point of interest is projected onto an image captured by the physical camera that is capable of capturing an image of the point of interest, and a color of a pixel located at a projection destination serves as the color of the point of interest. In a case where the images of the point of interest can be captured by a plurality of physical cameras, the point of interest is projected onto respective images captured by the plurality of physical cameras, respective pixel values of projection destinations are acquired, and an average of the pixel values is calculated, whereby the color of the point of interest is determined. However, the average of the pixel values may a simple average, or a weighted average using a weight identified based on a distance between a physical camera and the point of interest, a focal length (or angle of view) of the physical camera, resolution of the physical camera, or the like. Execution of such processing while changing the point of interest enables generation of the color information about the foreground object. The 3D model may be mesh data composed of a plurality of polygons.

The 3D model generation apparatus 102 may generate information regarding the number of foreground objects, position information, and foreground object information that identifies the foreground object in a process of generating the 3D model of the foreground object, and output the information to the data storage apparatus 103. The foreground object information may be information that enables identification of a type of the foreground object, for example, each player and a ball in a case of a game such as soccer. The foreground object information is, for example, identification (ID) that is unique to a player, and may be generated using an object detection technique or a face recognition algorithm. The object detection technique or the face recognition algorithm may be implemented by a trained model generated by learning such as machine learning.

The data storage apparatus 103 includes a virtual object storage unit 110 and a 3D model storage unit 111. The data storage apparatus 103 outputs stored data in response to an instruction from the virtual viewpoint image generation apparatus 106, which will be described below, to the virtual viewpoint image generation apparatus 106.

The virtual object storage unit 110 stores information about the virtual object arranged in a virtual space. The virtual object is not an object whose image is captured by the physical camera, but an object that is created virtually. The information about the virtual object includes a 3D model indicating a 3D shape of the virtual object (virtual object model) and texture data to be attached to the 3D model. Position information about the virtual object in the virtual space is also included in the information about the virtual object. The information about the virtual object is generated before the camera group 101 captures images, and is stored in the virtual object storage unit 110. The 3D model of the virtual object and the texture data about the virtual object may be artificially created using computer graphics (CG). The virtual object may be an object whose shape does not change over time (regardless of a time code), or an object whose partial shape or entire shape changes over time (depending on the time code). The object whose partial shape or entire shape changes over time (depending on the time code) may change in partial or entire shape on a periodic basis. The position of the virtual object may change over time (depending on the time code), or may not change regardless of a time table.

The 3D model storage unit 111 stores the 3D model of the foreground object generated by the 3D model generation apparatus 102, the color information about the foreground object, the plurality of images, and the extrinsic/intrinsic parameters of each camera. The 3D model storage unit 111 may record and store the information about the number of foreground objects, the position information, and the information about the foreground object, each of which is input from the 3D model generation apparatus 102.

The data storage apparatus 103 may store, in addition to the information about the virtual object and the information about the foreground object, information about a background object. The background object is different from the foreground object, and is a still object such as a wall of a studio and a stand of a stadium. The information about the background object includes a 3D model indicating a 3D shape of the background object and texture data of the background object. The information about the background object includes position information about the background object in the virtual space.

The virtual viewpoint control apparatus 105 accepts operation information from the controller 104 that is operated by an operator of the virtual viewpoint (virtual camera). The virtual viewpoint control apparatus 105 generates virtual viewpoint information for controlling the virtual viewpoint based on the operation information, and transmits the virtual viewpoint information to the virtual viewpoint image generation apparatus 106. For example, the controller 104 includes an input unit such as a joy stick, a jog dial, a touch panel, a keyboard, and a mouse. The operator who designates viewpoint information about the virtual camera operates the input unit to designate the position and orientation of the virtual camera. The position and orientation of the virtual camera mentioned herein indicates, specifically, the position of the virtual viewpoint and a line-of-sight direction (a view direction) from the virtual viewpoint.

The virtual viewpoint information is a parameter set including a parameter indicating a 3D position of the virtual viewpoint, and a parameter indicating the line-of-sight direction from the virtual viewpoint in a pan/tilt/roll direction. Contents of the virtual viewpoint information are not limited to the above description. For example, the parameter set as the virtual viewpoint information may include a parameter indicating a size (angle of view) of a visual field at the virtual viewpoint. In addition, the virtual viewpoint information includes a time code. The virtual viewpoint information may include a plurality of parameter sets. For example, the virtual viewpoint information may include a plurality of parameter sets corresponding to respective frames constituting virtual viewpoint moving images, and may be information indicating the position and orientation of the virtual viewpoint at each of a plurality of continuous time points.

The virtual viewpoint image generation apparatus 106 includes a virtual viewpoint acquisition unit 120, a virtual viewpoint image generation unit 121, and a virtual viewpoint image output unit 122.

The virtual viewpoint acquisition unit 120 acquires the virtual viewpoint information from the virtual viewpoint control apparatus 105. The virtual viewpoint acquisition unit 120 transmits the acquired virtual viewpoint information to the virtual viewpoint image generation unit 121.

The virtual viewpoint image generation unit 121 acquires, based on the acquired virtual viewpoint information, the information about the virtual object from the virtual object storage unit 110 and the 3D model from the 3d model storage unit 111, and generates the virtual viewpoint image. That is, the virtual viewpoint image generation unit 121 uses the 3D model of the virtual object and the 3D model of the foreground object to generate the virtual viewpoint image, which is an image virtually captured from a position of the virtual viewpoint. The virtual viewpoint image generation unit 121 may use the texture data of the virtual object and the texture data of the foreground object to generate the virtual viewpoint image. The texture of the foreground object in the virtual viewpoint image may be determined by the virtual viewpoint image generation unit 121 based on an image captured by each camera, the extrinsic/intrinsic parameters of each camera, and the virtual viewpoint information.

The virtual viewpoint image output unit 122 outputs the virtual viewpoint image generated by the virtual viewpoint image generation unit 121 to the display 107. In the present disclosure, an output destination of the virtual viewpoint image may not be a display. For example, the virtual viewpoint image may be directly sent to a distributor to distribute the virtual viewpoint image on the Web. The operator may watch the virtual viewpoint image displayed on the display 107 to designate the position and orientation of the virtual camera via the controller 104.

Figure 2:
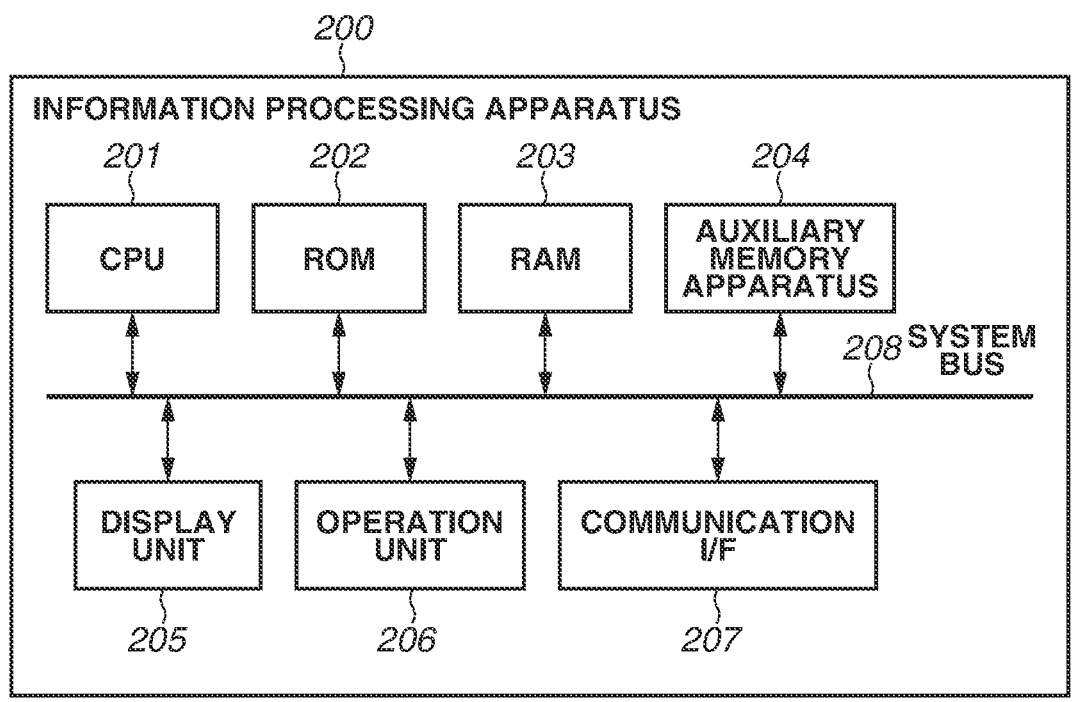
FIG. 2 is a hardware configuration diagram of an apparatus included in a system according to one or more aspects of the present disclosure.

FIG. 2 is a diagram illustrating a hardware configuration example of the following apparatuses included in the system according to the present exemplary embodiment. That is, the 3D model generation apparatus 102, the data storage apparatus 103, the virtual viewpoint control apparatus 105, and the virtual viewpoint image generation apparatus 106 can be implemented by the information processing apparatus illustrated in FIG. 2.

An information processing apparatus 200 can include a central processing unit (CPU) 201, a read-only memory (ROM) 202, a random-access memory (RAM) 203, an auxiliary memory apparatus 204, a display unit 205, an operation unit 206, a communication interface (I/F) 207, and a system bus 208. The display unit 205 and the operation unit 206 may not be included in the information processing apparatus 200.

The CPU 201 uses a computer program and data stored in the ROM 202 or the RAM 203 to control the whole of the information processing apparatus 200. The information processing apparatus 200 may include one or more dedicated hardware devices that are different from the CPU 201, and the dedicated hardware device(s) may execute at least part of processing of the CPU 201. Examples of such a dedicated hardware device include an application-specific integrated circuit (ASIC), a field-programmable gate array (FPGA) circuit, and a digital signal processor (DSP).

The ROM 202 stores a program or the like that requires no change. The RAM 203 temporarily stores a program and data supplied from the auxiliary memory apparatus 204, data supplied from the outside via the communication I/F 207, and the like. The auxiliary memory apparatus 204 is composed of, for example, a hard disk drive, and stores various kinds of data such as image data and acoustic data.

The display unit 205 includes, for example, a liquid crystal display and a light emitting diode (LED), and displays a graphical user interface (GUI) or the like. The GUI is used by the user to give an instruction to the information processing apparatus 200. The operation unit 206 includes, for example, a keyboard, a mouse, a joy stick, and a touch panel, and inputs various kinds of instructions to the CPU 201 in response to a user operation. The CPU 201 operates as a display control unit that controls the display unit 205 and as an operation control unit that controls the operation unit 206.

The communication OF 207 is used for communication with the camera group 101 and an external apparatus of the information processing apparatus 200. In a case where the information processing apparatus 200 has a function to perform wireless communication with the external apparatus, the communication I/F 207 includes an antenna.

The system bus 208 connects each unit of the information processing apparatus 200 to transmit information.

While the display unit 205 and the operation unit 206 are assumed to be arranged inside the information processing apparatus 200 in the present exemplary embodiment, at least one of the display unit 205 or the operation unit 206 may be arranged as another apparatus outside the information processing apparatus 200.

Figure 3:
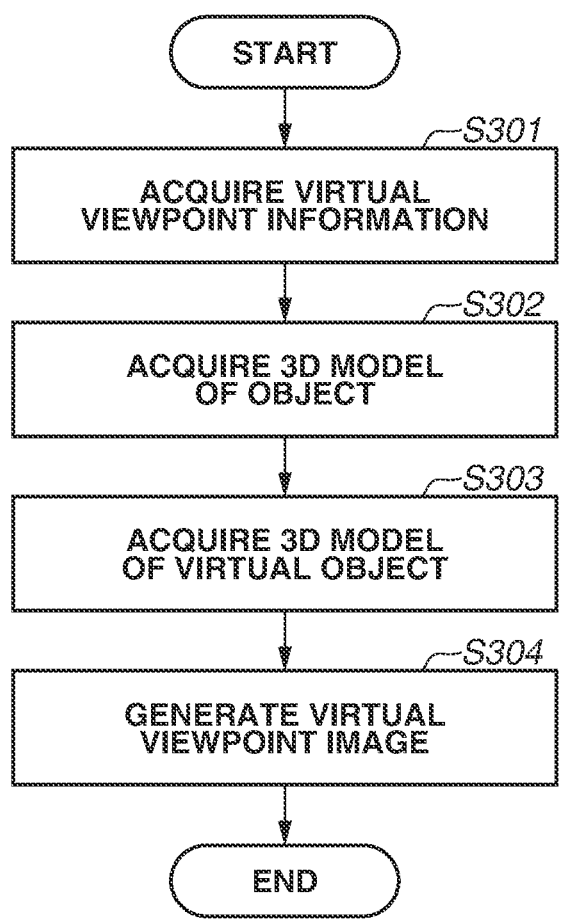
FIG. 3 is a flowchart of generation processing of generating a virtual viewpoint image according to one or more aspects of the present disclosure.

FIG. 3 is a flowchart of generation processing of generating the virtual viewpoint image in the virtual viewpoint image generation apparatus 106. A series of processes described in FIG. 3 is implemented by loading of a control program stored in the ROM 202 into the RAM 203 and execution of the control program by the CPU 201. The start of execution of the series of processes in FIG. 3 is triggered by reception of the virtual viewpoint information by the virtual viewpoint acquisition unit 120, which is included in the virtual viewpoint image generation apparatus 106, from the virtual viewpoint control apparatus 105.

In step S301, the virtual viewpoint image generation apparatus 106 acquires virtual viewpoint information from the virtual viewpoint control apparatus 105. Assume that the virtual viewpoint information includes information regarding the position, orientation, and angle of view of a virtual viewpoint, and a time code.

In step S302, the virtual viewpoint image generation apparatus 106 transmits the time code among pieces of the virtual viewpoint information acquired in step S301 to the data storage apparatus 103, and acquires a 3D model of a foreground object corresponding to the time code transmitted from the 3D model storage unit 111.

In step S303, the virtual viewpoint image generation apparatus 106 acquires a 3D model of a virtual object corresponding to a time code transmitted from the virtual object storage unit 110. In a case where the virtual object is an object that does not change depending on the time code, the virtual viewpoint image generation apparatus 106 does not necessarily acquire the virtual object based on the time code. For example, the virtual viewpoint image generation apparatus 106 may preliminarily retrieve the virtual object from the virtual object storage unit 110 prior to processing in step S302. In both of the case where the virtual object changes depending on the time code and the case where the virtual object does not change depending on the time code, the order to perform processes in steps S302 and S303 may be reversed.

In step S304, the virtual viewpoint image generation apparatus 106 generates a virtual viewpoint image based on the virtual viewpoint information acquired in step S301, the 3D model of the foreground object acquired in step S302, and the 3D model of the virtual object acquired in step S303.

Figure 4:
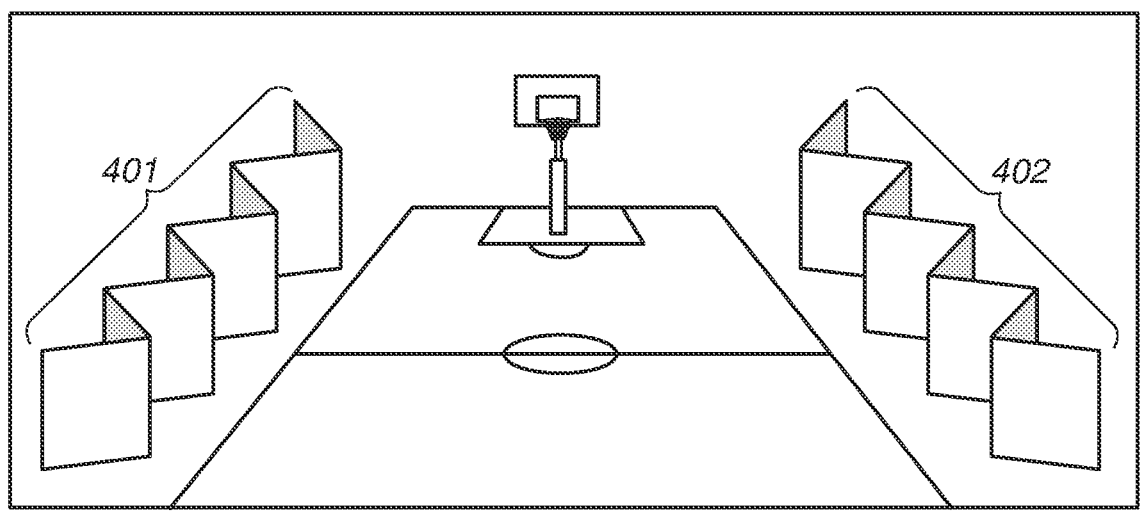
FIG. 4 is a schematic diagram of a virtual object according to one or more aspects of the present disclosure.

FIG. 4 illustrates an example of the 3D model of the virtual object according to the present exemplary embodiment. FIG. 4 illustrates an example in which virtual objects 401 and 402 each having a shape obtained by connecting a plurality of planes are arranged along respective side lines of a basketball court. The arrangement of the virtual objects 401 and 402 is not limited to the arrangement illustrated in FIG. 4. For example, the virtual objects 401 and 402 may be arranged along respective end lines. The virtual objects 401 and 402 may or may not be in contact with a surface on which the court is formed. The virtual objects 401 and 402 may be arranged inside the court. Either the virtual object 401 or the virtual object 402 may be arranged. Alternatively, a configuration in which similar virtual objects are arranged along the respective end lines may be employed.

Figure 5:
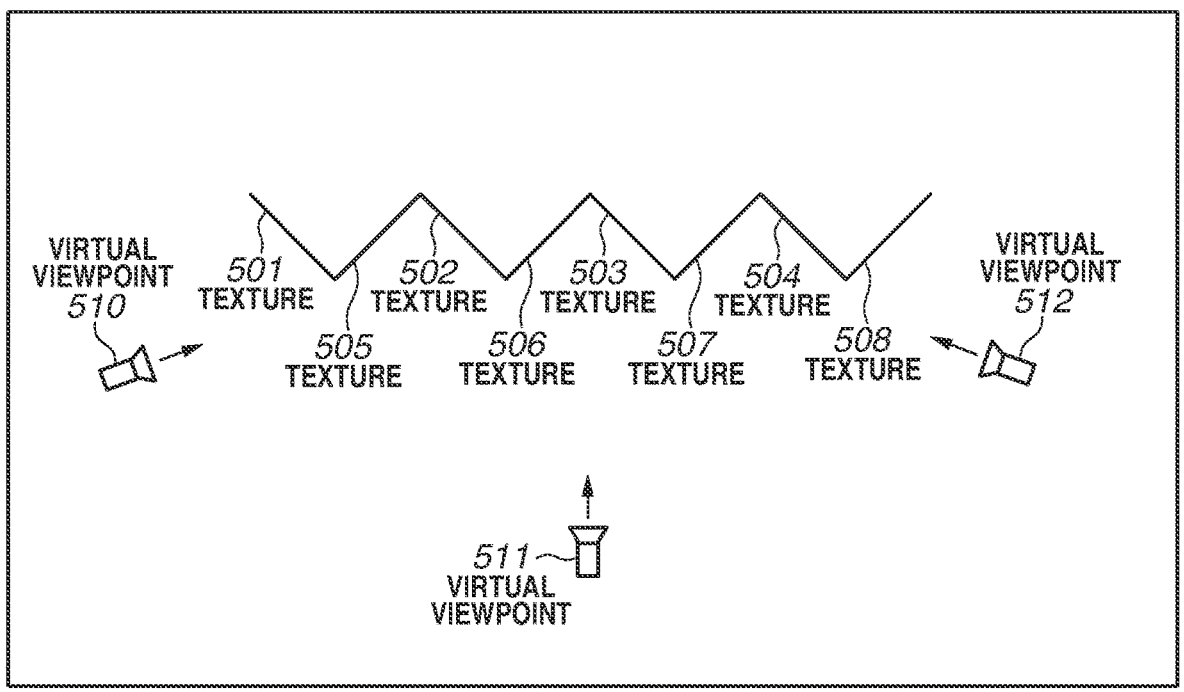
FIG. 5 is a top view of the virtual object according to one or more aspects of the present disclosure.

The virtual object 401 is now to be described in more detail with reference to FIGS. 5 to 8. The virtual object 402 has a similar configuration, and thus a description thereof is omitted. FIG. 5 is a diagram illustrating the virtual object 401 when viewed from directly above. A 3D model of the virtual object 401 is composed of eight planes. Textures 501 to 508 are attached to the respective eight planes. The eight planes include four planes (textures 501 to 504) that can be visually recognized from a virtual viewpoint 510 and four planes (texture 505 to 508) that can be visually recognized from a virtual viewpoint 512. Each of the four planes that can be visually recognized from the virtual viewpoint 510 is hereinafter referred to as a first plane, and each of the four planes that can be visually recognized from the virtual viewpoint 512 is hereinafter referred to as a second plane. In this case, the virtual object 401 is configured so that the first plane and the second plane are alternately connected to each other. Each of the first planes cannot be visually recognized from the virtual viewpoint 512, while each of the second planes cannot be visually recognized from the virtual viewpoint 510.

An angle between the first plane and the second plane is an angle at which the first plane can be visually recognized and the second plane cannot be visually recognized from the virtual viewpoint 510, and the second plane can be visually recognized and the first plane cannot be visually recognized from the virtual viewpoint 512. In other words, a normal line of the first plane and a normal line of the second plane are set to form an angle at which the first plane can be visually recognized and the second plane cannot be visually recognized from the virtual viewpoint 510, and the second plane can be visually recognized and the first plane cannot be visually recognized from the virtual viewpoint 512. For example, in a case where an angle between the first plane and the second plane is set at 90 degrees, a normal direction of the second plane is a direction in which a normal direction of the first plane is rotated counter-clockwise by 90 degrees about the axis in the vertical direction of the plane of paper of FIG. 5. In this case, if a line-of-sight direction from the virtual viewpoint 510 is set as the opposite direction of the normal direction of the first plane, the first plane can be visually recognized and the second plane cannot be visually recognized. Assume that the normal direction of a plane is, at a position of a centroid of the plane, a direction that is perpendicular to the in-plane direction of the plane and that faces the court side. The angle between the first plane and the second plane is assumed to be 90 degrees, but may be another angle.

Figure 6:
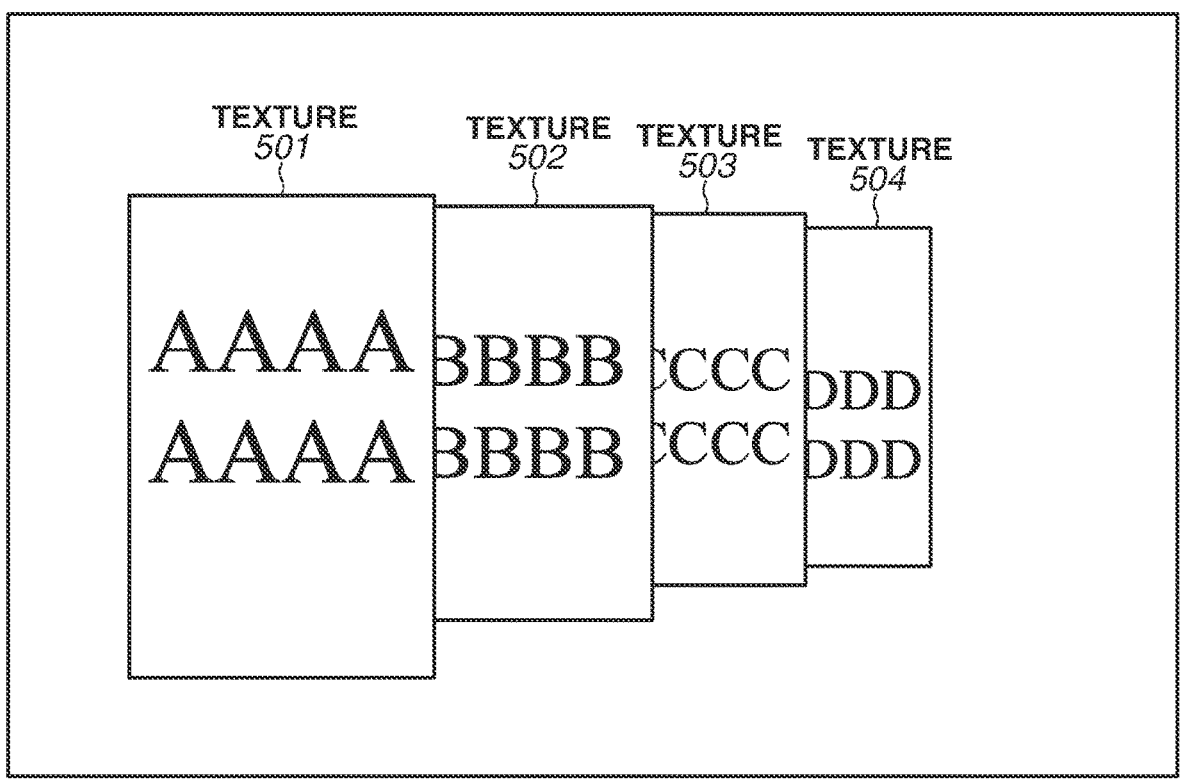
FIG. 6 is a diagram illustrating the virtual object when viewed from a virtual viewpoint according to one or more aspects of the present disclosure.

The target object being visually recognizable from the virtual viewpoint means that the target object is displayed in the virtual viewpoint image, which is an image virtually captured from the virtual viewpoint. For example, FIG. 6 illustrates a virtual viewpoint image generated based on the virtual viewpoint 510 illustrated in FIG. 5. In this case, the first planes of the virtual object 401 are included in the virtual viewpoint image. That is, textures 501 to 504 are displayed in the virtual viewpoint image. In contrast, the second planes of the virtual object 401 are not included in the virtual viewpoint image. That is, textures 505 to 508 are not displayed in the virtual viewpoint image.

Figure 7:
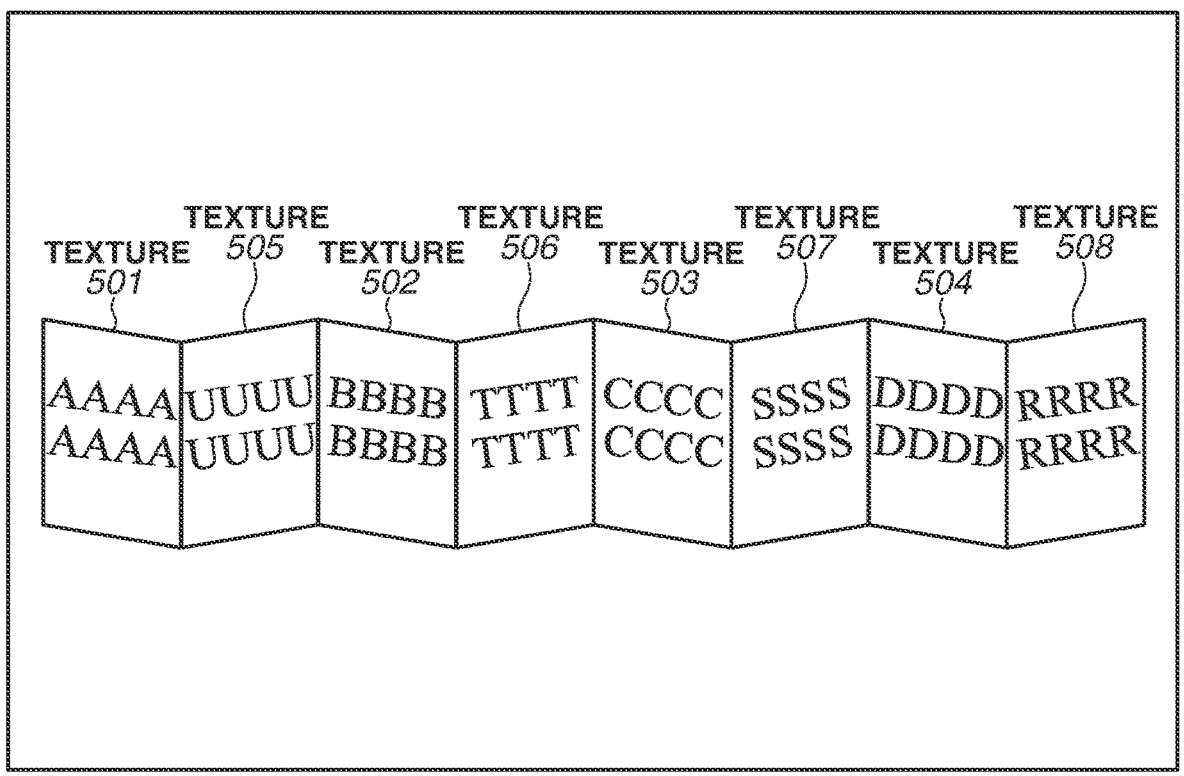
FIG. 7 is a diagram illustrating the virtual object when viewed from another virtual viewpoint according to one or more aspects of the present disclosure.

FIG. 7 illustrates a virtual viewpoint image generated based on a virtual viewpoint 511 illustrated in FIG. 5. In this case, both the first and second planes of the virtual object 401 are included in the virtual viewpoint image. That is, the textures 501 to 508 are displayed in the virtual viewpoint image.

Figure 8:
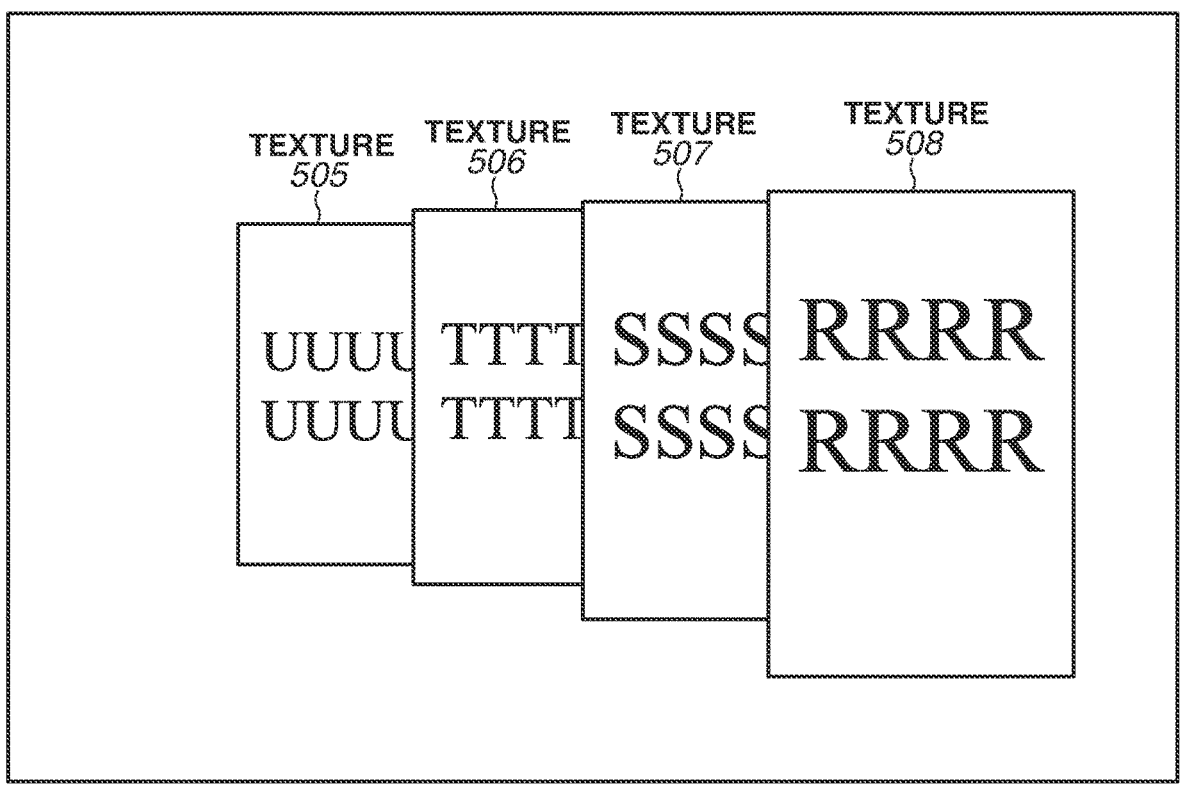
FIG. 8 is a diagram illustrating the virtual object when viewed from the other virtual viewpoint according to one or more aspects of the present disclosure.

FIG. 8 illustrates a virtual viewpoint image generated based on the virtual viewpoint 512 illustrated in FIG. 5. In this case, the second planes of the virtual object 401 are included in the virtual viewpoint image. That is, the textures 505 to 508 are displayed in the virtual viewpoint image. In contrast, the first planes of the virtual object 401 are not included in the virtual viewpoint image. That is, the textures 501 to 504 are not displayed in the virtual viewpoint image.

The virtual viewpoint 510 is only required to be a viewpoint from which the first plane of the virtual object 401 can be visually recognized and the second plane of the virtual object 401 cannot be visually recognized. That is, the position of the virtual viewpoint 510 and the line-of-sight direction from the virtual viewpoint 510 are the position and the line-of-sight direction from which the first plane can be visually recognized, and from which the second plane cannot be visually recognized. If this condition is satisfied, there may be a plurality of virtual viewpoints 510. The same applies to the virtual viewpoint 512. That is, the virtual viewpoint 512 is only required to be a viewpoint from which the second plane of the virtual object 401 can be visually recognized and the first plane of the virtual object 401 cannot be visually recognized.

Texture data of the virtual object 401 is now to be described. An image associated with a player is used as a texture attached to the first plane. For example, the textures 501 to 504 may be captured images of mutually different players. The textures 501 to 504 may be captured images of mutually different scenes of a player who holds a ball. The textures 501 to 504 may be images created for introduction of players. The textures 501 to 504 may be still images or moving images. The textures 501 to 504 may be images of players on the offensive side or images of players on the defensive side. In a case where the captured images of players are used, statistics of the match may be displayed together. A plurality of players to be sequentially displayed on the first planes may be displayed on different first planes depending on score ranking in the match or the like. That is, an image of a player who is ranked first in the score ranking may be used as the texture 501, an image of a player who is ranked second in the score ranking may be used as the texture 502, an image of a player who is ranked third in the score ranking may be used as the texture 503, and an image of a player who is ranked fourth in the score ranking may be used as the texture 504. The images used as the textures 501 to 504 may be images of players selected by voting by general users such as fans.

A texture attached to the second plane is an advertisement image. For example, the textures 505 to 508 may be mutually different advertisement images, or identical advertisement images. The textures 505 to 508 may be still images or moving images. The textures 505 to 508 may be an advertisement of what a player wears, for example, an advertisement of basketball shoes.

The texture data of the first plane and the second plane is not limited to the above examples, and may be another data. For example, the texture data of the first plane or the second plane may be a captured image of the audience at a game venue. The texture data of the first plane or the second plane may be an image for boosting the match in conjunction with of a dunk scene or the like.

The first and second planes are described as flat planes, but at least part of the first and second planes may be curved planes, or the whole of the first and second planes may be curved planes. Part of the plurality of first planes may be curved planes. The same applies to the second planes.

The texture of the virtual object is attached to a surface facing the court. In a case where the virtual viewpoint is arranged outside the virtual object, that is, the court, the virtual object 401, and the virtual viewpoint are arranged in this order, the texture of the virtual object 401 is not included in the virtual viewpoint image corresponding to the virtual viewpoint. This is to prevent a circular object on the court from being blocked by the virtual object 401 and being invisible. Transmittance of the texture of the virtual object 401 may be adjusted so that both the foreground object and the virtual object 401 are displayed. In a case where the foreground object is not blocked by the virtual object 401, the texture of the virtual object 401 may be displayed.

As described above, the virtual object according to the present exemplary embodiment has such a 3D shape as that is obtained by alternately connecting the first plane and the second plane to each other and whose first plane can be visually recognized and whose second plane cannot be visually recognized from the virtual viewpoint. This configuration can provide a viewing effect that is different depending on the line-of-sight direction from the virtual viewpoint. Specifically, only the second plane being visually recognizable from a direction of the virtual viewpoint can provide a new viewing experience, and can thereby increase an advertising effect. According to the present exemplary embodiment, the more appealing virtual viewpoint image including the virtual object can be generated.

In the present exemplary embodiment, in a case where a ball game is to be imaged, the textures 501 and 504 may be images related to a human figure who holds a ball. For example, the textures 501 to 504 may be images of other human figures in the same team as the team of the human figure who holds the ball. That is, the textures 501 to 504 may be images of mutually different human figures. In this case, the textures 505 to 508 may be images of human figures in a team that is different from the team of the human figure who holds the ball.

Alternatively, as images related to the human figure who holds the ball, images indicating statics of the human figure may be used as the textures 501 to 504. Each of the textures 501 to 504 may be a logo of a company that has signed a sponsorship deal with the human figure, an image of a commodity of the company, or a commercial message (CM) of the company. Alternatively, images designated by the human figure may be used as the textures 501 to 504. Still alternatively, highlight moving images of the human figure may be used as the textures 501 to 504.

In a case where FIG. 4 is the virtual viewpoint image, statistics of the human figure who holds the ball may be used as textures attached to the virtual object 401's planes that can be seen from this virtual viewpoint. Images of other human figures in the same team may be used as textures attached to the virtual object 402's planes that can be seen from the virtual viewpoint. This relationship may be reversed. Alternatively, an image of a logo of a sponsor of the team, an image of a commodity of the sponsor, or the like may be used as textures attached to the virtual object 402's planes that can be seen from the virtual viewpoint.

The textures 501 to 508 may be changed every time the human figure who holds the ball changes. Each of the textures 501 to 508 may be an image captured by a physical camera or a virtual viewpoint image.

In a case where each of the textures 501 to 508 is an image of a human figure, the image may be switched to a virtual viewpoint image from a viewpoint of the human figure by selection of any of the textures 501 to 508. In a case where each of the textures 501 to 508 is the logo or commodity of the company, selection of any of the textures 501 to 508 may lead to a homepage of the company or a commodity sales site. Each of the textures 501 to 508 may include a two-dimensional bar code for the commodity sales site, social networking service (SNS) of the human figure, or the like.

The textures 501 to 508 may be determined in association with the orientation of the virtual camera. For example, in a case where there are the offensive and defensive sides such as a ball game and the virtual viewpoint 510 is a virtual viewpoint of the virtual camera along a direction toward the offensive side, images of human figures on the offensive side may be used as the textures 501 to 504. In this case, images of human figures on the defensive side may be used as the textures 505 to 508.

Figure 9:
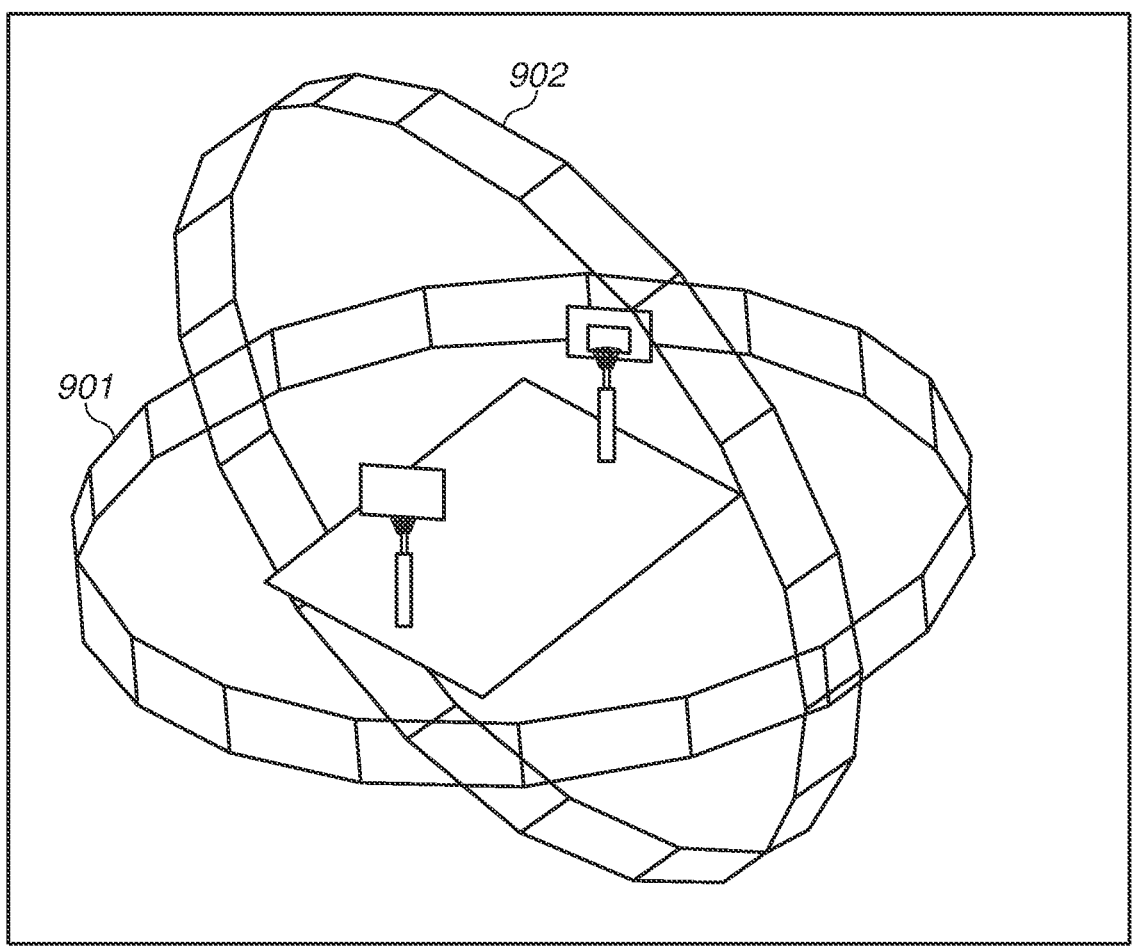
FIG. 9 is a schematic diagram of a virtual object according to a second exemplary embodiment.

In a second exemplary embodiment, a virtual object having a 3D shape different from that in the first exemplary embodiment is to be described. FIG. 9 is a diagram illustrating the virtual object according to the present exemplary embodiment. Specifically, virtual objects 901 and 902 each have a belt-like ring structure, and are arranged so as to surround a court as illustrated in FIG. 9. The virtual objects 901 and 902 are each composed of a plurality of planes. The virtual objects 901 and 902 may or may not intersect with each other. Radii of the respective rings of the virtual objects 901 and 902 may be identical, or different from each other.

The number of rings surrounding the court is not limited to two, and another virtual object having a ring shape may be arranged. Planes of the virtual objects 901 and 902 are not limited to flat planes, and the virtual objects 901 and 902 may be composed of a plurality of curved planes or one curved plane.

An image related to a player may be used for a plane of the virtual object 902, and an advertisement may be used for a plane of the virtual object 902. The advertisement may be used for both the virtual objects 901 and 902. Game scores, an interim report of another game, or a game result of another game may be displayed on the virtual objects 901 and 902.

The texture of the virtual object is attached to a surface facing the court. In a case where the virtual viewpoint is arranged outside the virtual object, that is, the court, the virtual object 901, and the virtual viewpoint are arranged in this order, the virtual viewpoint image corresponding to the virtual viewpoint is not included in the texture of the virtual object 901. This is to prevent a circular object on the court from being blocked by the virtual object 901 and being invisible. Transmittance of the texture of the virtual object 901 may be adjusted so that both the foreground object and the virtual object 901 are displayed. In a case where the foreground object is not blocked by the virtual object 901, the texture of the virtual object 901 may be displayed.

The present exemplary embodiment may be combined with the virtual object according to the first exemplary embodiment. The virtual object according to the first exemplary embodiment and the virtual object according to the present exemplary embodiment may be switched exclusively. In a case where switching is performed, the switching may be performed by automatic designation or the user's designation as to whether the virtual object according to the first exemplary embodiment or the virtual object according to the present exemplary embodiment is selected. The virtual object according to the first exemplary embodiment and the virtual object according to the present exemplary embodiment may be simultaneously displayed on the virtual viewpoint image.

Figure 10:
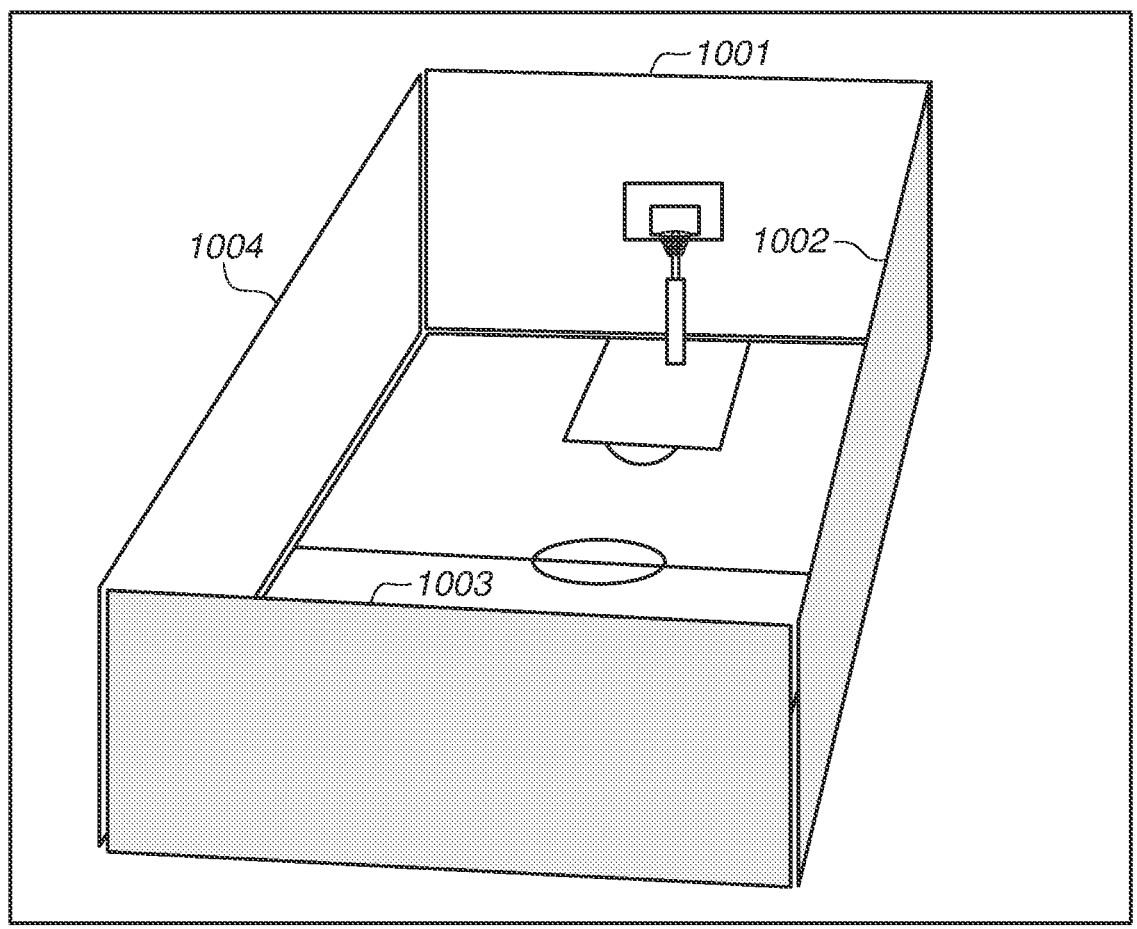
FIG. 10 is a schematic diagram of a virtual object according to one or more aspects of the present disclosure.

In a third exemplary embodiment, a virtual object having a 3D shape different from those in the first and second exemplary embodiments is to be described. FIG. 10 is a diagram illustrating the virtual object according to the present exemplary embodiment. Specifically, the entire court is surrounded with virtual objects 1001 to 1004. In the present exemplary embodiment, the number of virtual objects is not limited to four. FIG. 10 illustrates the virtual objects 1001 to 1004 and all textures are attached to the inside of the court.

The textures of the virtual objects 1001 to 1004 may be, for example, such textures as that provide feeling of depths when the virtual objects 1001 to 1004 are viewed from the inside of the court. With this configuration, the textures may have an effect of creating an illusion as if the court had a space larger than an actual space. Images related to players may be used for part of the virtual objects, and advertisement images may be used for the other virtual objects.

Similarly to the above-mentioned exemplary embodiments, the transmittance of the texture may be controlled depending on the position of the virtual viewpoint. The first and second exemplary embodiments may be combined.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-125088, filed Aug. 4, 2022, and No. 2023-098260, filed Jun. 15, 2023, which are hereby incorporated by reference herein in their entirety.

What is claimed is:

1. A virtual viewpoint image generation apparatus comprising:
   one or more memories storing instructions; and
   one or more processors executing the instruction to:
   obtain a foreground model that is generated based on a plurality of captured images and that represents a three-dimensional shape of a foreground;
   obtain a virtual object model that represents a three-dimensional shape of a virtual object;
   obtain viewpoint information that represents a position of a virtual viewpoint and a view direction from the virtual viewpoint; and
   generate a virtual viewpoint image based on the obtained foreground model, the obtained virtual object model, and the obtained viewpoint information,
   wherein the virtual object has a shape with an alternate repetition of one of a plurality of first planes and one of a plurality of second planes,
   wherein a normal line of each first plane and a normal line of each second plane extend in different directions,
   wherein a virtual viewpoint image generated based on first viewpoint information on a first virtual viewpoint represents the plurality of first planes but does not represent the plurality of second planes, and
   wherein a virtual viewpoint image generated based on second viewpoint information on a second virtual viewpoint includes the plurality of second planes but does not include the plurality of first planes.

2. The virtual viewpoint image generation apparatus according to claim 1, wherein a virtual viewpoint image generated based on third viewpoint information on a third virtual viewpoint represents the plurality of first planes and the plurality of second planes.

3. The virtual viewpoint image generation apparatus according to claim 1, wherein the virtual object is an object whose image is not captured.

4. The virtual viewpoint image generation apparatus according to claim 1, wherein the virtual viewpoint image is generated by adjusting transmittance of the virtual object based on a position of the foreground model and a position of the virtual object model.

5. A generation method of generating a virtual viewpoint image, the generation method comprising:
   obtaining a foreground model that is generated based on a plurality of captured images and that represents a three-dimensional shape of a foreground;
   obtaining a virtual object model that represents a three-dimensional shape of a virtual object;
   obtaining viewpoint information that represents a position of a virtual viewpoint and a view direction from the virtual viewpoint; and
   generating a virtual viewpoint image based on the obtained foreground model, the obtained virtual object model, and the obtained viewpoint information,
   wherein the virtual object has a shape with an alternate repetition of one of a plurality of first planes and one of a plurality of second planes,
   wherein a normal line of each first plane and a normal line of each second plane extend in different directions,
   wherein a virtual viewpoint image generated based on first viewpoint information on a first virtual viewpoint represents the plurality of first planes but does not represent the plurality of second planes, and
   wherein a virtual viewpoint image generated based on second viewpoint information on a second virtual viewpoint represents the plurality of second planes but does not represent the plurality of first planes.

6. A non-transitory computer-readable storage medium that stores a computer program to cause a computer to execute a generation method of generating a virtual viewpoint image, the generation method comprising:
   obtaining a foreground model that is generated based on a plurality of captured images and that represents a three-dimensional shape of a foreground;
   obtaining a virtual object model that represents a three-dimensional shape of a virtual object;
   obtaining viewpoint information that represents a position of a virtual viewpoint and a view direction from the virtual viewpoint; and
   generating a virtual viewpoint image based on the obtained foreground model, the obtained virtual object model, and the obtained viewpoint information,
   wherein the virtual object has a shape with an alternate repetition of one of a plurality of first planes and one of a plurality of second planes,
   wherein a normal line of each first plane and a normal line of each second plane extend in different directions,
   wherein a virtual viewpoint image generated based on first viewpoint information on a first virtual viewpoint represents the plurality of first planes but does not represent the plurality of second planes, and
   wherein a virtual viewpoint image generated based on second viewpoint information on a second virtual viewpoint represents the plurality of second planes but does not represent the plurality of first planes.

* * * * *